United States Patent [19]
Belding et al.

[11] Patent Number: 6,018,953
[45] Date of Patent: Feb. 1, 2000

[54] AIR CONDITIONING SYSTEM HAVING INDIRECT EVAPORATIVE COOLER

[75] Inventors: William A. Belding, Danville, Calif.; William D. Holeman, Baton Rouge, La.; Chiang Lam, Milpitas, Calif.

[73] Assignees: NovelAire Technologies, L.L.C., Baton Rouge, La.; ACMA Ltd., Singapore, Singapore

[21] Appl. No.: 08/917,973

[22] Filed: Aug. 27, 1997

Related U.S. Application Data

[62] Division of application No. 08/638,883, Apr. 25, 1996, Pat. No. 5,727,394
[60] Provisional application No. 60/011,497, Feb. 12, 1996.
[51] Int. Cl.$^7$ ...................................................... F25D 17/06
[52] U.S. Cl. .................................................. 62/94; 62/271
[58] Field of Search ................................. 62/271, 94, 93, 62/314; 165/7

[56] References Cited

U.S. PATENT DOCUMENTS

| | | | |
|---|---|---|---|
| 4,729,774 | 3/1988 | Cohen et al. | 96/123 |
| 5,187,946 | 2/1993 | Rotenberg et al. | 62/314 |
| 5,526,651 | 6/1996 | Worek et al. | 62/271 |
| 5,660,048 | 8/1997 | Belding et al. | 62/94 |
| 5,816,065 | 10/1998 | Maeda | 62/271 |
| 5,860,284 | 1/1999 | Goland et al. | 62/94 |

*Primary Examiner*—Henry Bennett
*Assistant Examiner*—Melvin Jones
*Attorney, Agent, or Firm*—Andrew Alexander

[57] ABSTRACT

A method of conditioning a process stream of air in an air conditioning system wherein a process stream of air is dehumidified and cooled to provide a conditioned stream of air for introducing to a conditioned space. The method comprises the steps of providing an adsorption wheel having a multiplicity of passages through which process air can flow for adsorbing moisture therefrom, the wheel capable of adsorption of moisture from the process air and of regeneration on a continuous basis as the wheel rotates. An indirect evaporative cooler is provided having a dry side and a wet side separated by a moisture-impervious wall wherein heat is extracted from said dry side through the wall to the wet side. Cooling in the dry side is achieved by evaporation of water into air passing through the wet side. The process air is passed through the adsorption wheel to remove moisture therefrom to provide a moisture-depleted stream of process air exiting the adsorption wheel. The adsorption wheel is regenerated by passing hot gases therethrough to remove moisture from the adsorption wheel. The moisture-depleted stream of process air exiting said adsorption wheel is divided into a relatively hot stream and a relatively cool stream, and the relatively hot stream of process air is introduced into the wet side of the indirect evaporative cooler, and the relatively cool stream is introduced into the dry side, the relatively hot stream evaporating water thereinto thereby cooling the moisture-impervious wall and removing heat from the relatively cool stream to provide cooled air to be introduced to a conditioned space.

36 Claims, 6 Drawing Sheets

AIR CONDITIONING SYSTEM HAVING INDIRECT EVAPORATIVE COOLER

CROSS REFERENCE TO RELATED APPLICATION

This application is a division of application Ser. No. 08/638,883 filed Apr. 25, 1996 now U.S. Pat. No. 5,727,394.

This application claims the benefit of U.S. Provisional Application No. 60/011,497, filed Feb. 12, 1996.

BACKGROUND OF THE INVENTION

This invention relates to an improved method and apparatus for conditioning air such as warm moisture-laden air and more particularly, it relates to a novel combination for moisture removal and cooling process air using an improved indirect evaporative cooler.

Current air conditioning technology is based on compression and expansion of a gas such as chlorinated fluorocarbon or halogenated chloroflurocarbon or ammonia. The gas is compressed to a liquid state and then allowed to expand back to a vapor state. In the expansion stage of the process, heat is required to change the liquid back to a gas. However, this system has the disadvantage that the chlorinated fluorocarbons and the halogenated chlorofluorocarbons have been found to be environmentally damaging particularly to the earth's ozone layer. Ammonia results in health and safety problems when leaks develop in the system.

Vapor compression systems have another disadvantage in that they require electricity to drive compressors. At peak demand periods, the electricity required by air conditioning systems has resulted in brownouts. Thus, there is a great need for an air conditioning system that would greatly reduce the electricity demand.

Evaporative cooling technology provides an alternative to vapor compression technology. In direct evaporative cooling, water is evaporated into the air stream entering the space to be cooled. The evaporation of the water reduces the air temperature adiabatically without an enthalpy reduction. In an indirect evaporative cooling system, the primary air stream is cooled in a dry duct. An air stream is directed into an adjacent wet duct having a common wall with the dry duct. In the wet duct, water is evaporated into the air cooling the common wall and consequently the air in the dry duct. However, the evaporative cooling systems have the problem that they cannot be used in hot humid climates.

Desiccant cooling technology has been used for air conditioning wherein a desiccant material is used to remove water from air to provide a dry air stream. The dry air with is hot from an adsorption process is then cooled as closely as practical to ambient and then water is evaporated by and into the air stream to provide cooler air. This technique works well in theory; however, in practice, it has not been used very much. Conventional desiccant cooling systems have the problem that they usually require one or more heat wheels for rejecting heat from the process air stream. Heat wheels are subject to leakage. In addition, heat wheels have moving parts, add complexity and cost to the cooling system. In these applications, the air must be overdried and then rehumidified with a direct evaporative cooler.

Several attempts have been made to solve the above problems but usually with only limited success. For example, Tsimerman U.S. Pat. No. 5,050,391 discloses an apparatus and method for treating a gas in which a main gas stream is cooled and heat is transferred by convection to a liquid and a secondary gas stream across a heat transfer surface. Liquid bearing the heat evaporates into the secondary stream. A total gas stream is subjected to initial cooling along a moisture impervious surface of a heat exchange element to cause dry or sensible cooling. A secondary gas stream is diverted from the total discharge from the dry cooling stage and is directed counterflow to the total stream at the opposite surface of the heat exchange element which is an absorbent surface to cause heating and humidification of the secondary stream. The remaining cooled stream which is the primary stream is subjected to sorbent treatment to heat and dehumidify the same by flowing it through an absorbent media. The primary gas flow is then subjected to a final heat exchange treatment stage similar to the initial heat exchange treatment. Condensate may be removed from the saturated or near-saturated secondary flow. The primary flow may also be subjected to intermediate cooling treatment A portion of the initial and final dry cooling stages preferably include an adiabatic cooling zone. The secondary flow from the initial heat exchanger may be subdivided into two streams. One secondary sub-stream is dehumidified in the sorption device by an auxiliary heater and is used for regeneration of the absorbent media. However, this system discloses the use of a complicated adsorbent belt or plate and tubular heat transfer elements and therefore does not lend itself to easy commercialization.

Gunther U.S. Pat. No. 4,594,855 discloses a process and apparatus for ventilation with heat exchange wherein outdoors and indoors air streams are induced to travel in opposite directions through the adjacent passages of a plate-fin heat exchanger. A water stream is simultaneously induced to circulate through the passages occupied by the cooler of the air streams. Heat is transferred across adjacent passages, causing vaporization of a portion of the water stream into its accompanying air stream, thus keeping the cooler stream saturated with water vapor. The hotter air stream is cooled and dehumidified while the cooler one increases in temperature and humidity content.

Maisotsenko et al U.S. Pat. No. 4,977,753 discloses a method for indirect evaporative air cooling wherein the main air stream in a room is cooled by passing it along the dry duct and simultaneously passing an auxiliary air stream that has been taken from the atmosphere in a countercurrent flow along the moist duct, which is in heat-exchange interaction with the dry duct. To provide more intensified cooling, the auxiliary stream is precooled in another dry duct, which is in heat-exchange interaction with another moist duct.

Rotenberg et al U.S. Pat. No. 5,187,946 discloses an apparatus and method for indirect evaporative cooling of a fluid which includes an apparatus and method for indirect cooling of air from its ambient temperature to substantially its dew point. Ambient air is redirected through spaced openings formed along the heat exchanger plates to form a secondary air stream.

In the following patents, desiccants or adsorbents are used in conditioning air and, in particular, for lowering the humidity of the air: U.S. Pat. Nos. 2,147,248; 2,233,189; 2,266,219; 2,344,384; 3,251,402; 3,889,742; 4,113,004; 4,121,432; 4,719,761; 4,723,417; and 4,729,774.

Kaplan U.S. Pat. No. 5,170,633 describes a method and apparatus for conditioning air utilizing a desiccant based air conditioning system requiring substantially less regeneration energy than typical systems. This regeneration energy reduction is accomplished through the use of two separate desiccant devices and an indirect evaporative cooler having both a wet and dry side for air flow-through. In the first desiccant device regeneration air is first passed through the wet side of the indirect evaporative cooler wherein it is humidified and heated. This air is then dehumidified by passing it through the second desiccant device which is operated at a high moisture content. This results in a substantial amount of moisture being adsorbed from the first regeneration air stream causing a substantial air temperature increase and thereby, reducing the auxiliary heat required. The second desiccant device may be regenerated with ambient air.

Meckler U.S. Pat. No. 3,488,971 discloses air for comfort conditioning which is circulated through a chemical dehumidifier and then is forwarded to a space to be conditioned. Optional sensible cooling coils before and after chemical dehumidification are provided. Most of the lighting heat and most of the space load are transferred to relatively high temperature water, and from the water to the chemical dehumidifier for regeneration of the desiccant therein. A thermally activated heat pump, which can be of the thermo-electric type, is used to transfer heat to the high temperature water.

In spite of these disclosures, there is still a great need for a compact, economical air conditioning unit that functions in warm, moisture-laden air, e.g., outdoor air, or in warm dry air and which does not require large amounts of electricity in order to function. The present invention provides such an air conditioning system utilizing a novel combination of desiccant systems and evaporative cooling systems.

SUMMARY OF THE INVENTION

It is an object of this invention to provide an improved air conditioning system.

It is another object of this invention to provide an improved method for conditioning hot, moisture-laden air.

It is still another object of this invention to provide an improved air conditioning system comprised of a combination of desiccant and improved indirect evaporative cooling.

Still, it is another object of this invention to provide in an air conditioning system utilizing indirect evaporative cooling, a desiccant body, such as a desiccant wheel, wherein hot process air or the direct air from the desiccant body is used for cooling the indirect evaporative cooler by evaporation of liquid in the wet side of indirect evaporative cooler.

Yet, it is another object of this invention to provide an air conditioning system utilizing indirect evaporative cooling, a desiccant wheel and a heat exchanger wherein hot air from the desiccant wheel is cooled in a heat exchanger and thereafter directed into a wet side of the indirect evaporative cooler for purposes of cooling.

And yet, it is another object of this invention to provide an improved air conditioning system comprising an enthalpy wheel, a novel desiccant wheel and an indirect evaporative cooler wherein hot air from the desiccant wheel is introduced to the wet side of the indirect evaporative cooler for cooling purposes.

These and other objects will become apparent from the specification, claims and drawings appended hereto.

In accordance with these objects, there is provided a method of conditioning a process stream of air in an air conditioning system wherein a process stream of air is dehumidified and cooled to provide a conditioned stream of air for introducing to a conditioned space. The method comprises the steps of providing an adsorption wheel having a multiplicity of passages through which process air can flow for adsorbing moisture therefrom, the wheel capable of adsorption of moisture from the process air and of regeneration on a continuous basis as it rotates. An indirect evaporative cooler is provided having a dry side and a wet side separated by a wall, e.g., a moisture-impervious wall, wherein heat is extracted from said dry side through the wall to the wet side. Cooling in the wet side is achieved by evaporation of water into air passing through the wet side. The process air is passed through the adsorption wheel or absorption material, e.g., liquid desiccant, to remove moisture therefrom to provide a moisture-depleted stream of process air exiting the adsorption wheel. The adsorption wheel is regenerated by passing hot gases therethrough to remove moisture from the adsorption wheel. The moisture-depleted stream of process air exiting said adsorption wheel is divided into a secondary or relatively dry and/or hot stream and a primary stream which is usually cooler than the secondary stream. The secondary stream of process air is introduced into the wet side of the indirect evaporative cooler, and the primary stream is introduced into the dry side. The secondary stream evaporates water thereinto thereby cooling the moisture-impervious wall and removing heat from the relatively cool stream to provide cooled air to be introduced to a conditioned space.

DETAILED DESCRIPTION OF THE PREFERRED EMBODIMENTS

Figure 1:
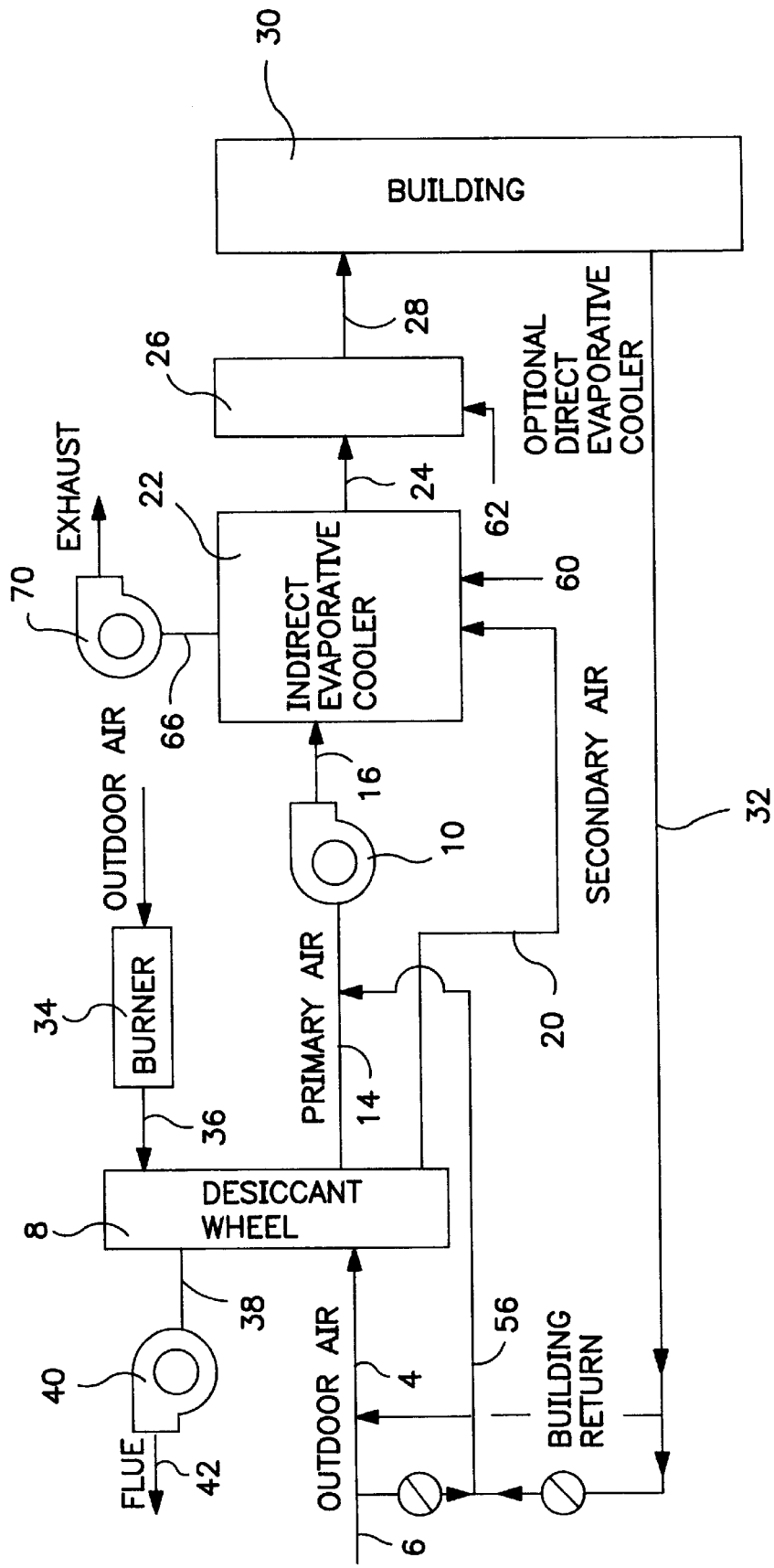
FIG. 1 is a flow diagram showing air flow steps as air is conditioned in accordance with the present invention.

Referring now to FIG. 1, there is shown a flow diagram illustrating the steps in dehumidifying and cooling a stream of air in an air conditioning system in accordance with the present invention. In FIG. 1, an ambient or outdoor air stream may be first passed through an air filter (not shown) to remove material such as dust particles and bugs, for example, before being passed along line 4 to desiccant wheel 8. An air mover means such as fan 10 may be employed to draw or force the air stream through the air conditioning system. As air, such as moisture-laden air, is passed through desiccant wheel 8, moisture is removed from the air stream to provide a moisture-depleted stream which passes along line 14, through fan 10 and along line 16. As air passes through desiccant wheel 8, the air becomes heated by virtue of heat of adsorption of the moisture on the desiccant. In addition, because desiccant wheel 8 is heated for regenerative or desiccant drying purposes, air passing therethrough becomes further heated. Thus, portions of the air leaving desiccant wheel 8 can have a much higher temperature, e.g., 175° F. in certain sections, than other portions or outdoor ambient air.

Moisture can be removed from the air in desiccant wheel 8 from levels of 0.01364 pounds of water per pound of air to levels of 0.0054 pounds or lower of water per pound of air, for example. This low level of water can be maintained through the air conditioning system and water added, if needed, as a last step.

In the present invention, fan 10 is located between desiccant wheel 8 and an indirect evaporative cooler 22. In this schematic, fan 10 draws air through desiccant wheel 8 and pushes air through indirect evaporative cooler 22 and thus circulates process or primary air through the air conditioning system. It will be appreciated that other locations for fan 10 can be used.

When fan 10 is located between desiccant wheel 8 and indirect evaporative cooler 22, it can draw process air through desiccant wheel 8. Further, if it is desired to pass only a portion of the process air through desiccant wheel 8, then a bypass loop 56 can be provided which takes process air past desiccant wheel 8, as shown in FIG. 1.

In the present invention, process air from desiccant wheel 8 is introduced to indirect evaporative cooler 22 where it is cooled to provide cooled dry air typically having a temperature in the range of 55 to 75° F.

After the air stream is cooled in indirect evaporative cooler 22, it may be passed along line 24 to direct evaporative cooler 26 or in certain cases, it may be directed to a room or building to provide conditioned air. In direct evaporative cooler 26, the temperature of the air can be reduced further and a controlled amount of humidity can be added thereto to provide conditioned air having a controlled temperature and humidity. The conditioned air leaving direct evaporative cooler can have a temperature in the range of 50 to 65° F. The conditioned air is conveyed along line 28 to conditioned space 30.

In the present invention, a controlled amount of air may be recirculated from the conditioned space along line 32 to desiccant wheel 8 where outdoor air is mixed therewith and added along line 4 where both are added to provide process or primary air 14.

In the air conditioning system of the present invention, the desiccant in the desiccant wheel is regenerated by heated air from burner or heater 34 which is passed along line 36 to desiccant wheel 8 where it is passed therethrough to remove water from desiccant wheel 8 by vaporization. Typically, the heated air in line 36 has a temperature in the range of 150 to 375° F. Further, preferably, heated air from burner 34 is drawn through line 38 from desiccant wheel 8 by fan 40 where it may be expelled to the atmosphere through line 42.

The process air, e.g., outdoor air and/or building return air entering desiccant wheel 8 immediately after regeneration, is usually the hottest and direct air. Thus, process air entering desiccant wheel 8 at 75 to 110° F., can have a temperature of 100 to 180° F. leaving desiccant wheel 8.

For purposes of cooling desiccant wheel 8, a purge stream of air may be passed through desiccant wheel 8 before passing process air therethrough. The fresh air purge may be introduced immediately after the regenerative step and before introduction of process air, e.g., outdoor air or recycled air, from the conditioned space. The purge has the effect of cooling desiccant wheel 8 prior to introduction of process air thereto.

For purposes of efficiency, at part load (less than maximum output of the air conditioner), a sensor can be provided to direct process air or a portion thereof around desiccant wheel 8 along line 56 to permit flow of air therethrough to line 14. Simultaneously therewith, burner 34, fan 40 and desiccant wheel 8 can be shut down or operated at reduced loading or capacity, further improving economic operation of the cooling unit.

For purposes of directing process air around desiccant wheel 8, a damper may be utilized to direct all or a portion of the process air around desiccant wheel 8. Also, dampers may be used to control the mix of return air and outdoor air and the amount of each directed to the desiccant wheel.

With respect to indirect evaporative cooler 22 and direct evaporative cooler 26, a water source is provided and water is introduced thereto along lines 60 and 62.

Air introduced along line 16 to the dry side of indirect evaporative cooler 22 may be referred to as primary or process air which is cooled without change in humidity. A secondary source of air is introduced to the wet side of the indirect evaporative cooler to cool the primary or process air through a heat exchange wall and is exhausted from indirect evaporative cooler 22 along line 66. The secondary source of air is important in that it directly affects the ability of the system to provide cool air.

In accordance with the invention, it is preferred to use air directly exiting the desiccant wheel 8 as secondary air for purposes of cooling indirect evaporative cooler 22. That is, a portion of the process air dried in desiccant wheel 8 is removed along line 20 and introduced to the wet side of indirect evaporative cooler 22. The portion of the process air directed along line 20 can include the purge air, if desired. It is preferred to utilize the driest air as secondary air exiting desiccant wheel 8 for introduction to the wet side of indirect evaporative cooler 22 because cooling in the wet side is achieved by evaporation of water into the secondary air stream. Thus, the dryer the air, the more cooling can be achieved. Usually, the driest and the hottest air is obtained immediately after regeneration of desiccant wheel 8 because the adsorption capacity of the wheel is usually greater at that point. As noted, the higher temperature is attributed to heat carried over from regeneration and heat of adsorption. It is preferred that the secondary air comprises 10 to 50%, typically 10 to 40%, of the air exiting the adsorption wheel.

The secondary air or direct air introduced to the wet side of indirect evaporative cooler 22 may flow countercurrent to the flow direction of the process air in the dry side or in the same direction. In certain applications, the air in the wet side may flow in a cross-flow direction to the primary air.

In one aspect of the invention, there is provided a first set of dry channels or first dry side and a second set of dry channels or second dry side. Primary air is directed through the first side of the indirect evaporative cooler and secondary air or driest air is directed through the second dry side where its temperature is reduced without change in humidity. The cooled process air is directed to the space to be cooled. The secondary air, after exiting the second dry side, is directed into the wet side where evaporation occurs, thereby cooling the first and second dry sides. In this aspect of the invention, usually the primary and secondary air flow concurrent in their respective channels or dry sides and then the secondary air is directed to flow countercurrent to the flows in the first and second dry sides. However, it should be understood that any combination of these flows such as cross-current, countercurrent and concurrent, may be used and are contemplated within the purview of the invention. However, it is important in this aspect of the invention that separation of the primary and secondary streams be maintained after their exiting the desiccant wheel.

Indirect evaporative cooler 22 serves or operates as a heat exchanger and usually consists of alternating adjacent wet and dry channels separated by a thin wall of low heat transfer resistance. Indirect evaporative cooler 8 can be constructed from metal or plastic with plastic being preferred because of the low cost and low thermal conduction in the direction of flow. Water is introduced to the secondary air in the wet side by spraying or wicking wherein wicking material on the wet side is overlaid on the thin wall separating the wet and dry channels.

As noted, secondary air 20 leaving desiccant wheel 8 is both at its driest and hottest, particularly when it follows regeneration. Thus, in another aspect of the invention, for more efficient cooling, it is preferred to cool secondary air 20 while maintaining the high level of dryness prior to its being directed to the wet side of indirect evaporative cooler 22. It is preferred to direct secondary air 20 through heat exchanger 18 (FIG. 2) prior to its being introduced to the wet side of indirect evaporative cooler 22. Heat exchanger 18 can lower the temperature of secondary air 20 substantially, typically to 130° F. or lower. Further, outside air 50 can be used to cool heat exchanger 18 and after passing through heat exchanger 18, such air can be directed along line 48 for burning or heating in burner 34, thereby lowering the amount of heat to be added for regeneration purposes.

Heat exchanger 18 is an important aspect of the present invention because it remarkably increases the efficiency of the subject air conditioning system. That is, the use of heat exchanger 18 increases the amount of heat that can be removed in indirect evaporative cooler 22 and also reduces the amount of heat that has to be added to the system by burner 34. Both savings significantly increase the overall efficiency of the air conditioning system.

Figure 2:
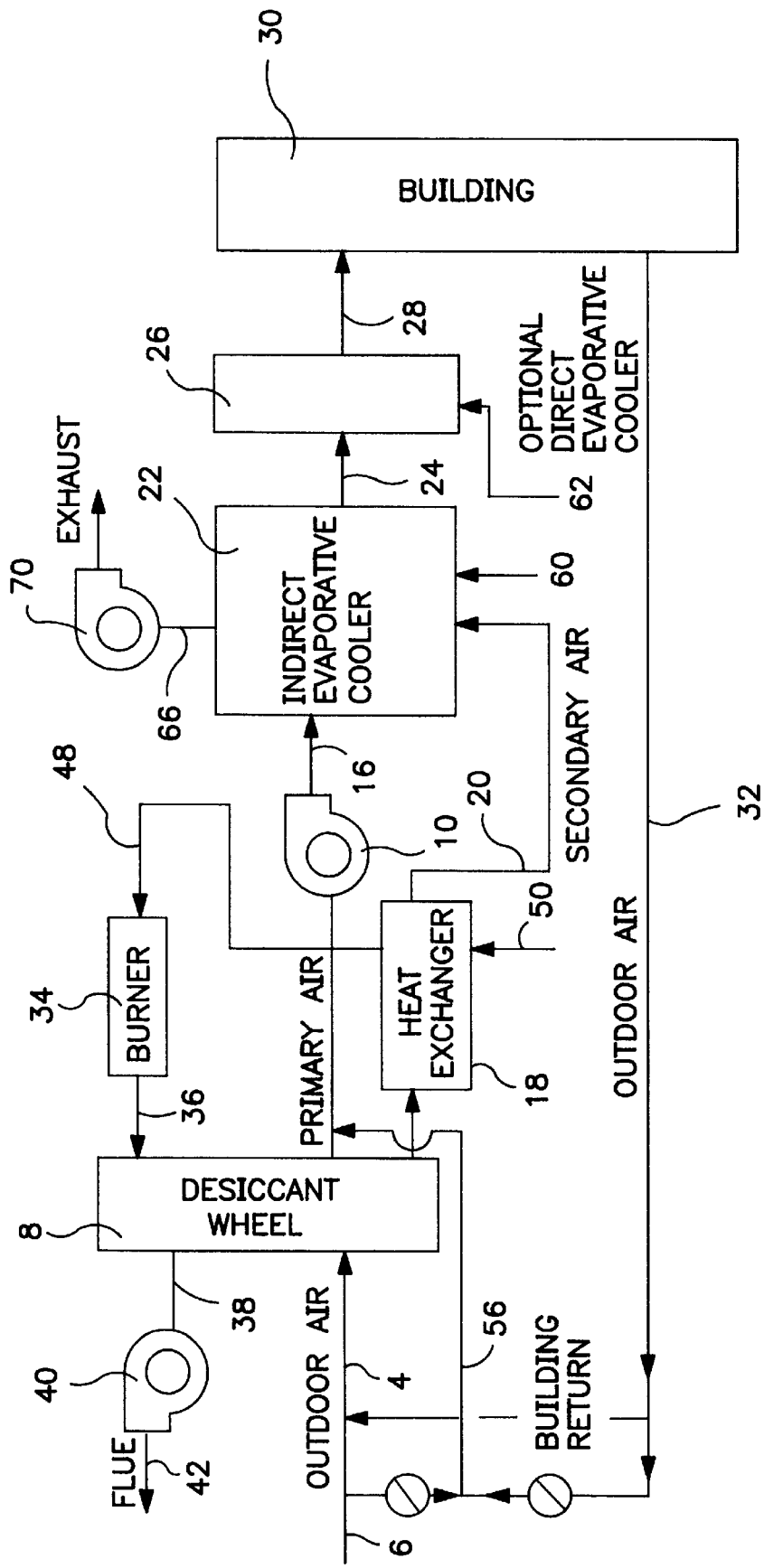
FIG. 2 is a flow diagram showing a process for conditioning air wherein a heat exchanger is utilized to cool a hot stream or secondary stream of air directed to an indirect evaporative cooler.

For purposes of cooling secondary air from desiccant wheel 8 in heat exchanger 18, a source of outside air is used. Outside air is introduced along line 50 and is passed through heat exchanger 18 as shown in FIG. 2 for cooling heat exchanger 18. The temperature of outside air used for cooling heat exchanger 18 is significantly increased. For example, the temperature of outside air used for cooling heat exchanger 18 can increase from ambient, e.g., about 85° F., to 150° F. or even higher. Thus, in the present invention, as noted, the cooling air exiting heat exchanger 18 is further heated in burner 34 and then passed through desiccant wheel 8 for purposes of regeneration. This is another important feature of the present invention which results in high coefficient of performance values. That is, the amount of heat required to be added by burner 34 to provide a stream of air in line 36 having the necessary temperature to regenerate desiccant wheel 8 is significantly reduced.

Heat exchanger 18 can be any heat exchanger that permits heat exchange from one air stream to another. For example, heat pipes or a loop having two coils and a circulating heat transfer liquid can be used. Air-to-air heat exchangers which have been used have been fabricated out of aluminum parallel plates. Such heat exchangers are available from Xetex or Deschamp Laboratories.

Figure 5:
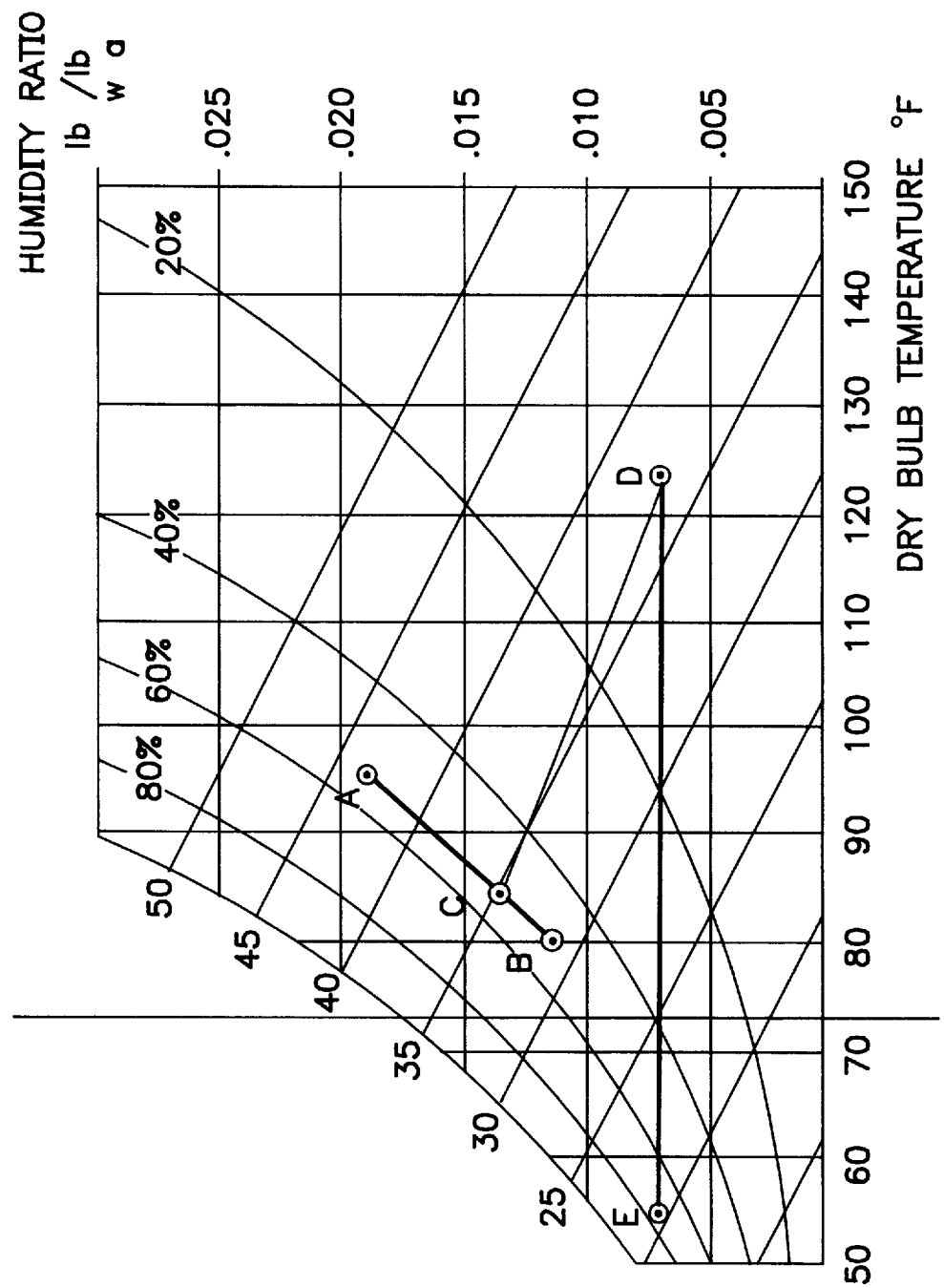
FIG. 5 is a psychrometric chart showing steps of the invention.

The psychrometrics of the system illustrated in FIG. 2 is schematically illustrated in FIG. 5. Outdoor air is provided at condition A and building return air is provided at condition B. Both sources of air are mixed to provide a mixture at condition C. The mixture at condition C is introduced to desiccant wheel 8 where moisture is removed and the temperature of the mixture increases considerably, depending on the segment of the wheel. Air exiting the first segment of the wheel, i.e., secondary air, immediately after regeneration can have a temperature of 168° F. and contain 0.0026 lbs water/lb or air. Air exiting the remainder of wheel 8, i.e., primary air, is delivered to indirect evaporative cooler 22 at condition D. The secondary air (168° F. air) is used for purposes of cooling indirect evaporative cooler 22 but preferably, first, is cooled in an air-to-air heat exchanger 18 (FIG. 2) to about 130° F. without change in moisture. Secondary air used for cooling indirect evaporative cooler 22 can result in process or primary air exiting the indirect evaporative cooler at condition E (FIG. 5) where it can be delivered to a conditioned space. When secondary air is introduced to the wet channels of indirect evaporative cooler 22, it exits the wet channel substantially saturated at about 0.050 lbs water/lb air. The secondary air may be precooled in dry channels separate from the dry channels through which the primary process air is passed in order to maintain the high level of dryness in the secondary air. Typically the secondary air leaving the wet channel is about 108° F.

If desired, the process air may be reduced in temperature further by directing it through direct evaporative cooler 26 after exiting indirect evaporative cooler 22. In direct evaporative cooler 26, the process air temperature is adibatically reduced by evaporating water into the process air.

Figure 3:
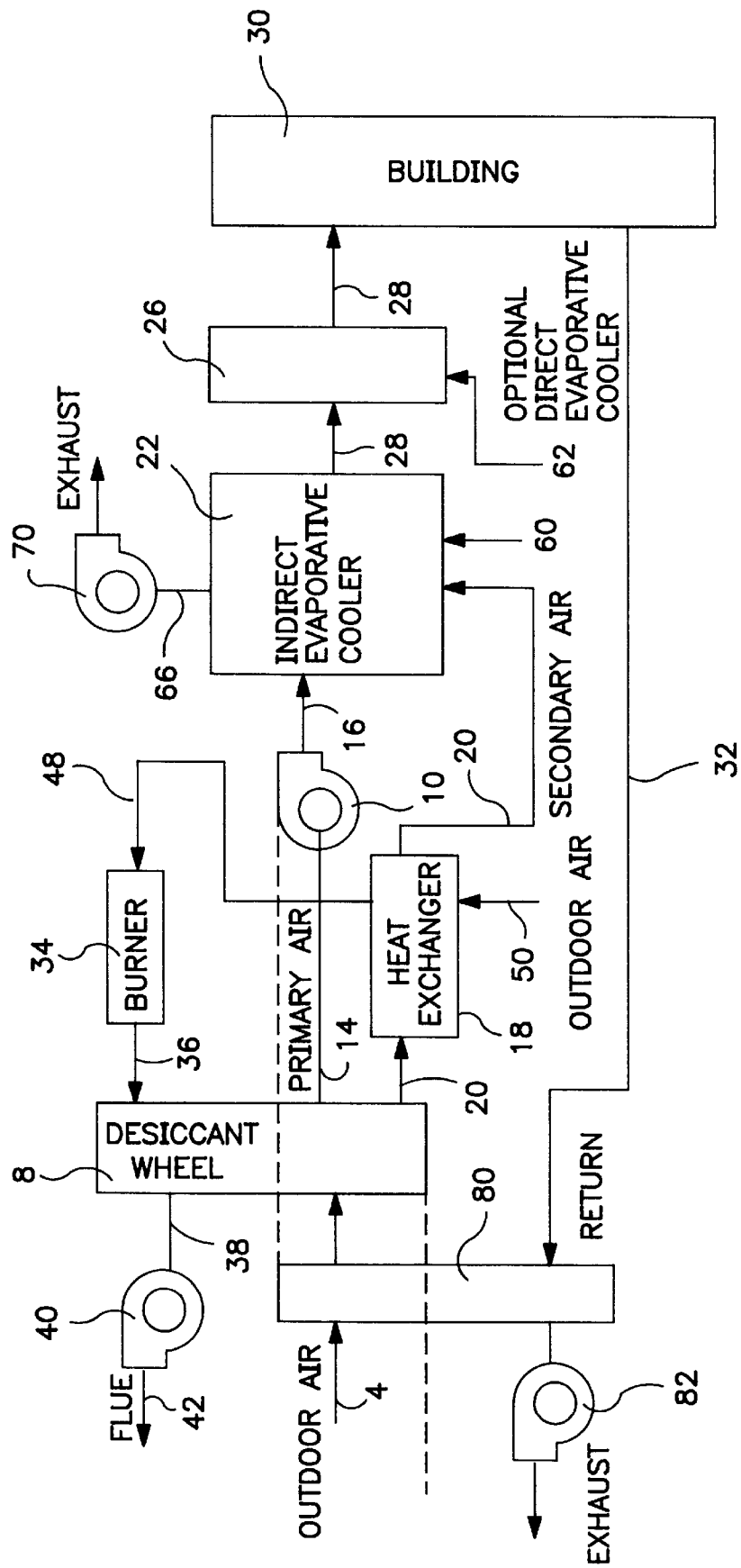
FIG. 3 is a flow diagram showing a process for conditioning air wherein a heat exchanger is utilized to cool a hot stream or secondary stream of air directed to an indirect evaporative cooler wherein an enthalpy wheel is used to treat the air prior to the air being directed to a desiccant wheel.

Another embodiment of the invention is illustrated in FIG. 3. In this embodiment, an enthalpy wheel 80 is located before desiccant wheel 8. That is, in this embodiment, outdoor air or ambient air is first introduced to enthalpy wheel 80 before entering desiccant wheel 8. In enthalpy wheel 80, sensible heat is removed and moisture is adsorbed from outdoor air 4 prior to the air entering desiccant wheel 8. Thus, both heat and moisture are removed from outdoor air 4 before it is further dried in desiccant wheel 8. Enthalpy wheel 80 is regenerated using a source of air which is drier and cooler, such as air from conditioned space 30. Air from conditioned space 30 is passed along line 32 using fan 82 and introduced to enthalpy wheel 80 in a direction countercurrent to the flow of outdoor air 4. Fan 82 may be located on the exhaust side of enthalpy wheel 80 in a draw through mode. This embodiment of the invention has the advantage that it is particularly suitable for processing outdoor air for purposes of providing conditioned air. However, mixtures of outdoor air and recycled air can be employed.

Alternatively, humidity can be added to the cooled process air in yet another way. That is, the cooled process air exiting indirect evaporative cooler 22 can be co-mingled or mixed with building return air or outdoor air or both, herein bypass air. Referring to FIGS. 1 and 2, bypass 56 can be used to introduce more humid air to the primary air from the building return or outdoor air substantially as shown. It will be appreciated that this bypass air can be added at any point as long as it provides the desired humidity. Adding bypass air for purposes of humidity has the advantage that it eliminates the need for a direct evaporative cooler. The degree of cooling provided by the indirect evaporative cooler is unaffected because the dew point of the secondary air introduced to the wet channels is not changed. When outdoor air is drier than indoor air, the outdoor air may be directed through bypass 56 to indirect evaporative cooler 22 with little or no air being dried by the desiccant wheel.

Enthalpy wheel 80 is fabricated from a material suitable for removing both heat and moisture from incoming or outdoor air. Thus, enthalpy wheel 80 is turned at a speed sufficient, e.g., 1 to 50 rpm, so that heat and moisture can be removed from enthalpy wheel 80 by air removed along line 32 from conditioned space 30. Typically enthalpy wheel 80 is fabricated to provide a multiplicity of parallel pores or openings such as a honeycomb structure through which air passes. The wheel can be formed from a coated material such as aluminum, plastic, fiberglass, ceramic and paperboard or desiccant paper having one side corrugated and one side flat. The wheel is formed by winding the coated material into the wheel shape to provide air passageways parallel to the axis of the wheel or by coating an expanded honeycomb material Preferably, enthalpy wheel 80 is fabricated from a desiccant paper employing a fibrous material and a desiccant material dispersed in the fibrous material which has the capability of removing both heat and moisture. Suitable fibrous materials are disclosed therein. Preferred desiccants useful in enthalpy wheel 80 are zeolites. Suitable zeolites include 3A, 4A, 5A, 13X, NaY, HY and USY with 3A and 4A zeolites being preferred. Particle size of the zeolites can range from 0.1 to 50 $\mu$m with a preferred particle size being 1 to 4 $\mu$m. Smaller pore size zeolites are preferred because they do not retain or adsorb airborne contaminants and thus aid in purifying air in the conditioned space.

Figure 6:
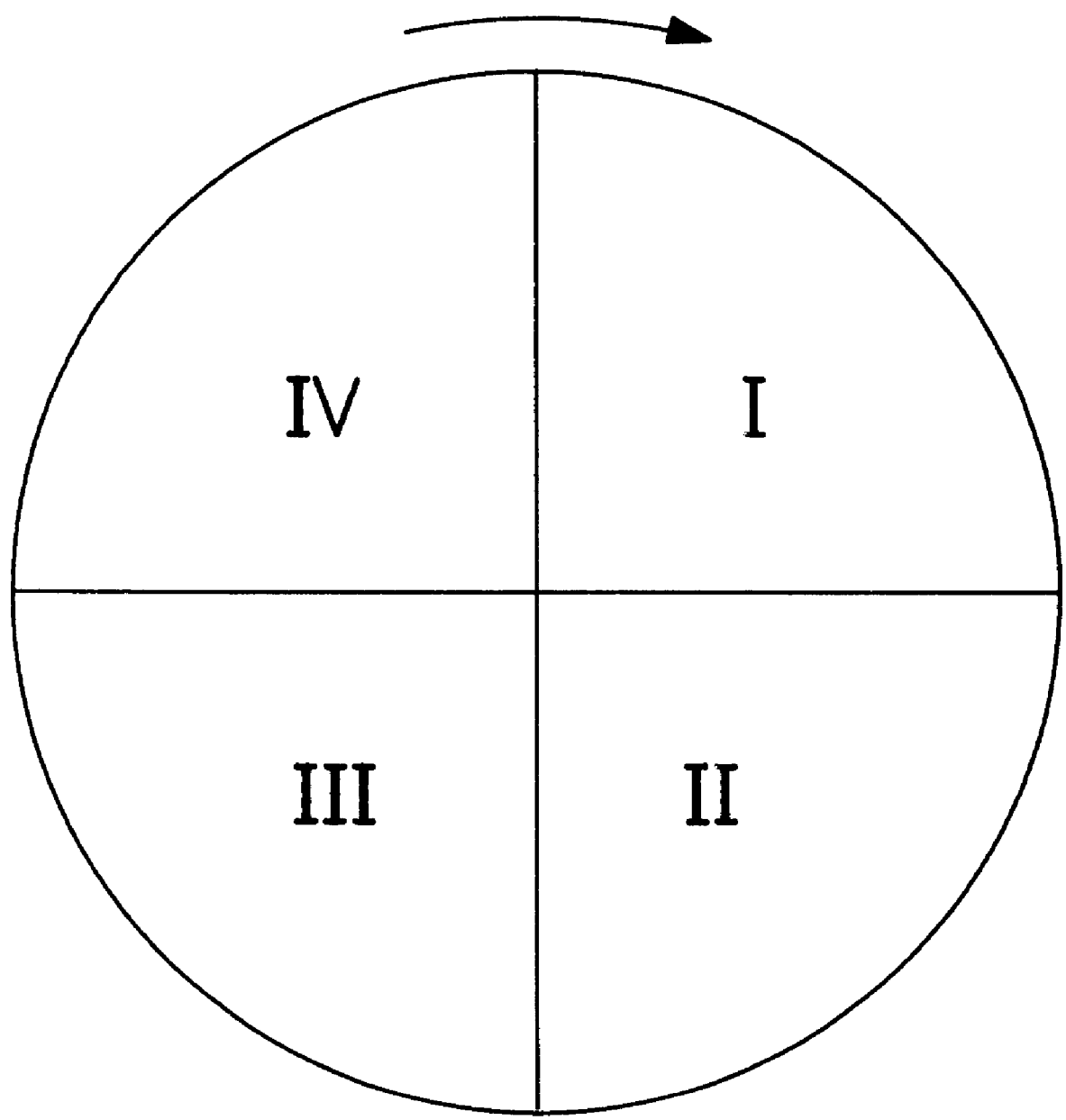
FIG. 6 is a schematic representation of a desiccant wheel showing four quadrants.

FIG. 6 depicts the process inlet face of desiccant wheel 8 as seen by entering process air. In the present invention, quadrants I, II and III can be used for incoming air for purposes of removing moisture therefrom. Quadrant IV is typically used for purposes of regeneration in which hot air and gas from burner 34 flow in a direction counter to the process air. Thus, after passing through desiccant wheel 8, air from quadrant I, secondary air, would be directed to heat exchanger 18, if a heat exchanger is used, and then to the wet side of indirect evaporative cooler. Air from quadrants II and III would be directed as process air to the dry side of indirect evaporative cooler 22. It will be understood that these quadrants are selected for illustration purposes, and that the quadrants used for dehumidifying and regeneration are not necessarily 90° sections and may be changed to suit particular needs.

If regeneration is carried out in quadrant IV, with or without a purge, it will be seen that the hottest part of desiccant wheel 8 in FIG. 6 (showing inlet face of wheel) will be encountered in quadrant I when desiccant wheel 8 turns clockwise. Thus, in one preferred mode of operation, air emanating from quadrant I, secondary air, is separated from the process air in quadrants II and III. In this mode, only the secondary air from quadrant I is passed through heat exchanger 18.

It should be understood that the amount of secondary air used in indirect evaporative cooler 22 can be varied depending on conditions. For example, 15 to 40% of the incoming air can be directed to the wet side of indirect evaporative cooler 22.

Figure 4:
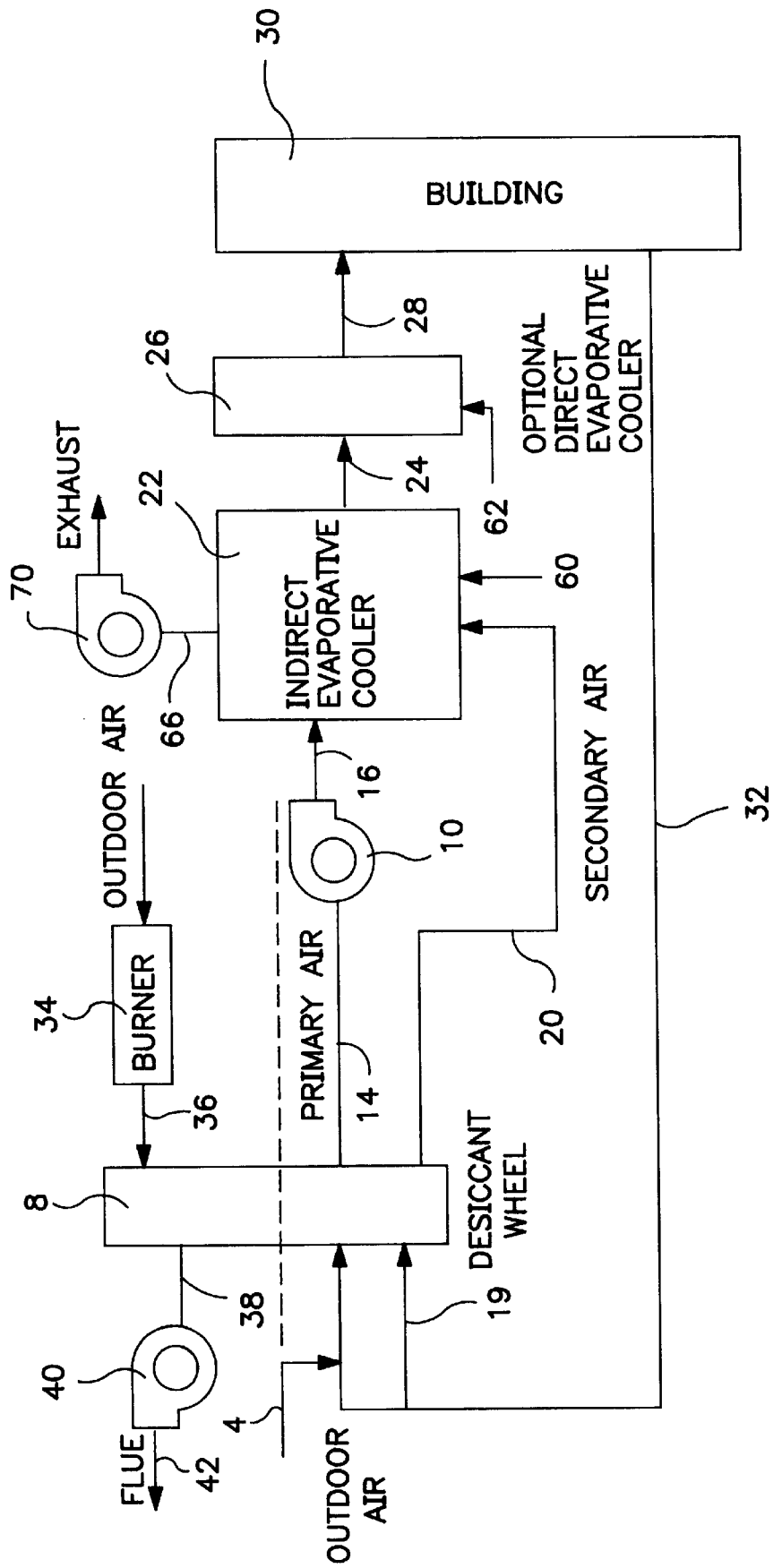
FIG. 4 is a flow diagram showing a process for conditioning air wherein a portion of the return air is dried and then introduced to the wet side of an indirect evaporative cooler.

For purposes of enhancing cooling in indirect evaporative cooler 22, it is preferred to use the driest air obtainable for directing into the wet side. That is, the drier the air, the greater the capacity for cooling per unit of air volume. Thus, in a preferred embodiment, air recycled from building 30 is directed along line 32 and re-introduced to desiccant wheel 8. The recycled air is divided into primary air and secondary air (see FIG. 4) entering desiccant wheel 8. The primary air is dried and cooled to provide conditioned air for introducing to building 30. Secondary air is introduced along line 19 for purposes of drying and then directed along line 20 to the wet side of indirect evaporative cooler 22. To compensate for the amount of recycled air exhausted by virtue of its passing through the wet side of indirect evaporative cooler 22 along line 66 and through fan 70 to the atmosphere, make-up air or outdoor air is added to line 32 along line 4 and introduced as primary air.

Thus, only recycled air is used as secondary air. Because the recycled air is usually lower in humidity than outdoor air, desiccant wheel 8 provides the driest air from the recycled air. Thus, this method of operation has the advantage of improving cooling capacity, efficiency and indoor air quality. That is, make-up air continually provides a fresh air supply to building 30. It should be understood that the configuration of FIG. 4 can be used with a heat exchanger (not shown) to cool secondary air exiting desiccant wheel 8, as described earlier, prior to its being introduced to the wet side of indirect evaporative cooler 22, and such is contemplated within the purview of the invention.

In another aspect of the invention, it has been discovered that wheel speed can be used to adjust the humidity in the process air. When wheel speed is increased, the secondary air exiting the wheel is less dry or contains more moisture and the primary or process air becomes drier or contains less moisture. Consequently, the indirect evaporative cooler will accomplish less cooling and the process air supplied to the building will be warmer and drier. Conversely, when the desiccant wheel is rotated at a slower speed, the opposite occurs and the process air has a higher moisture content and is lower in temperature. Thus, changing desiccant wheel speed can be used to control building humidity and temperature without the use of a direct evaporative cooler. It should be noted that this control is possible as a result of using a two-stream system. For purposes of controlling the humidity, a humidity sensor is provided in the conditioned space. The humidity sensor is in communication with a variable or multiple speed desiccant wheel controller which operates to turn the desiccant wheel faster or slower in response to the level of humidity in the conditioned space. In this way, the speed of the desiccant wheel can be used for controlling the humidity in the conditioned space. It will be understood that any means can be used that changes the desiccant wheel speed in response to the change in humidity in the conditioned space.

In the present invention, reference is made to desiccant wheel 8. However, it should be understood that desiccant wheel 8 can be replaced with a desiccant body and air duct work provided to periodically regenerate a part of the desiccant material while another part of the desiccant material is being used to remove moisture from the process air. Further, the process air stream can be divided into a first air stream and a second air stream. The body can be regenerated by passing hot gases through the body after the first air stream. The second air stream gets depleted of moisture and also cools the body. Preferably, the second air stream is directed to the wet side of the indirect evaporative cooler. Such is contemplated within the scope of the invention. When a desiccant wheel is used, typically the wheel rotates at a speed of about 1 to 30 rph and the function of removing moisture from process air and regenerating desiccant wheel 8 using a hot air stream or combustion products from burner 34 is performed on a continuous basis.

While reference herein is made to desiccant wheels or desiccant bodies, it should be understood that liquid desiccant bodies can be utilized. Such liquid desiccants can be any liquid desiccant and can include, for example, lithium chloride, lithium bromide or glycols such as ethylene or propylene glycols. Typically, a vessel is used for absorption and another vessel used for regeneration.

The desiccant wheel has a central hub and a casing. Between hub and casing is provided a regenerative media or paperboard having desiccant dispersed therein for removing moisture from the process air stream.

In one embodiment, the media is fabricated by providing alternating layers of flat and corrugated paperboard that are positioned to provide a multiplicity of open-ended passages parallel to the axis of rotation to permit air to flow therethrough. Typically, the media is formed by winding a web of corrugated paperboard (having a flat sheet of paperboard bonded to one side) about the hub until a multi-layered media is built up that extends to the outer casing. The corrugated paperboard having one side flat is made by bonding or positioning a flat strip of paperboard over a corrugated strip of paperboard. The width of the strip determines the width of the wheel, and the edges of the paperboard forms the faces of the wheel. It should be understood other fabrication techniques that form passages may be used.

The media or paperboard for desiccant wheel 8 can be comprised of a fibrous material and any material that operates to remove moisture from an air stream such as process air on a continuous basis.

In accordance with the present invention, there is provided a preferred, adsorptive desiccant wheel formed from a desiccant paperboard comprising temperature-resistant fibrillated synthetic organic or inorganic fibers and a desiccant material containing either an X-type zeolite in conjunction with silica gel and/or pseudoboehmite alumina or a chemically modified Y-type zeolite.

The desiccant utilized in the desiccant wheel can comprise different blends of alumina, silica gel and zeolite. For example, the desiccant can comprise 20–60 wt. % alumina, 0–40 wt. % silica gel, the balance comprising X- or Y-type zeolite. In a preferred embodiment, the desiccant can comprise 20 to 50 wt. % alumina, 20 to 30 wt. % silica gel, with the balance X- or Y-type zeolite. For example, the desiccant can comprise 45 wt. % alumina, 35 wt. % silica gel and 20 wt. % 13-X zeolite, or it can comprise 33 wt. % alumina, 33 wt. % silica gel and 34 wt. % 13-zeolite. In certain instances, the desiccant can comprise alumina and zeolite, for example, 50 wt. % alumina and 50 wt. % 13-X zeolite.

In the present invention, fibrillated organic fibers, because of their strength and ability to interlock, provide suitable reinforcement at levels as low as 15% by weight of the total desiccant paperboard.

A number of different organic and inorganic fiber materials may be used for the desiccant paper for the desiccant wheel, depending upon the temperatures at which the desiccant wheel is regenerated. For example, inorganic fibers such as fine-diameter fiberglass, mineral wool, or other ceramic materials, may be employed. Although such fibers are stable over a wide range of temperatures, they can suffer from cracking during the paper corrugation stage. Natural organic fibers such as cotton may also be used, although they are limited in regeneration temperature. Synthetic organic fibers useful in the invention are those comprising high-density polyethylenes, high-density polypropylenes, aromatic polyamides (i.e., aramids), polystyrenes, aliphatic polyamides, poly(vinyl chlorides), acrylics (e.g., CFF® fibrillated fibers sold by Cyanamic), acrylonitrile homopolymers, copolymers with halogenated monomers, styrene copolymers, and mixtures of polymers (e.g., polypropylene with low-density polyethylene, and high-density polyethylene with polystyrene).

However, due to its strength, light weight and temperature resistance, the preferred organic fiber for the desiccant wheel of the present invention is selected from aramids. The aramids are manufactured fiber in which the fiber-forming substance is a long-chain synthetic polyamide in which at least 85% of the amide (—CO—NH—) linkages are directly attached to the two aromatic rings. Such aramid fibers are available from DuPont under the trademark KEVLAR®. KEVLAR® is commercially available as a refined pulp designed for paper forming, such as KEVLAR® 303 pulp. During refining, the KEVLAR® fiber shafts are split at the ends into fibrils by means of application of high shear, thereby creating a tree-like structure. In the manufacture of paperboard, it has been discovered that the fibrils interlock to enhance the paperboard strength. KEVLAR® is stable in oxidizing atmospheres up to 450° C. Other high-temperature resistant aramids such as NOMEX®, available from DuPont, is suitable for formation of paperboard in the present invention. However, it is preferred that such fibers are refined or fibrillated in a similar manner.

For purposes of the present invention, KEVLAR® 303 pulp having fiber shafts that are approximately 12 $\mu$m in diameter and up to 4 mm in length is first dispersed to form an aqueous slurry. The slurry is then fed to a disc or other high-shear refiner, which is effective in further splitting the fibrillated fiber shafts into additional fibrils. After the refining step, the KEVLAR® 303 fiber shafts range from 1 mm to 4 mm in length with fibrils extending therefrom that are as small as 1 $\mu$m to 3 $\mu$m in diameter.

The desiccant wheel can be manufactured using the above materials to provide a wheel or body which will readily adsorb moisture contained in ambient air and desorb the resulting moisture from the wheel during a regeneration cycle of short duration.

While any type of indirect evaporative cooler 22 may be used, with the proviso that dry air from the desiccant wheel be directed to the wet side, the indirect evaporative cooler disclosed in U.S. Pat. Nos. 5,301,518 and 5,318,843, incorporated herein by reference, may be used.

While the invention has been described with respect to cooling, its use is not necessarily limited thereto. For example, the system may be used for heating where heat, for example, may be generated by the burner and such heat directed to the conditioned space with duct work (not shown), and such is contemplated within the invention.

While the invention has been described in terms of preferred embodiments, the claims appended hereto are intended to encompass other embodiments which fall within the spirit of the invention.

What is claimed is:

1. A method of conditioning a process stream of air in an air conditioning system wherein a process stream of air is dehumidified and cooled to provide a conditioned stream of air for introducing to a conditioned space, the method comprising the steps of:

(a) providing an adsorption wheel having a multiplicity of passages through which process air can flow for adsorbing moisture therefrom, the wheel capable of adsorption of moisture from said process air and of regeneration on a continuous basis as the wheel rotates;

(b) providing an indirect evaporative cooler having a dry side and a wet side separated by a wall wherein heat is extracted from said dry side through the wall to said wet side, cooling in said dry side achieved by evaporation of water into air passing through said wet side;

(c) passing the process air through said adsorption wheel to remove moisture therefrom to provide a moisture-depleted stream of process air exiting said adsorption wheel;

(d) regenerating said adsorption wheel by passing hot gases therethrough to remove moisture from said adsorption wheel;

(e) dividing said moisture-depleted stream of process air exiting said adsorption wheel into a primary stream and a secondary stream, the secondary stream comprised of drier and hotter air than said primary stream;

(f) introducing said secondary stream of process air to a heat exchanger thereby cooling said secondary stream to provide a stream of cooled secondary air; and (g) introducing said stream of cooled secondary air into said wet side of said indirect evaporative cooler and introducing said primary stream into said dry side, said stream of cooled secondary air evaporating water thereinto thereby cooling said wall and removing heat from said primary stream to provide cooled air to be introduced to a conditioned space.

2. The method in accordance with claim 1 wherein said secondary stream comprises 10 to 40% of said moisture-depleted stream exiting said adsorption wheel.

3. The method in accordance with claim 1 wherein said secondary stream exiting said adsorption wheel has an average temperature higher than the average temperature of said primary stream exiting said adsorption wheel.

4. The method in accordance with claim 1 including returning air from said conditioned space and processing through said adsorption wheel.

5. The method in accordance with claim 1 including utilizing an outside air stream to cool said heat exchanger.

6. The method in accordance with claim 1 including heating said outside air stream exiting said heat exchanger for regenerating said adsorption wheel.

7. The method in accordance with claim 1 including directing said secondary stream to flow concurrent to the direction of flow of said primary stream in said indirect evaporative cooler.

8. The method in accordance with claim 1 including directing said secondary stream to flow countercurrent to the direction of flow of said primary stream in said indirect evaporative cooler.

9. The method in accordance with claim 1 including directing said secondary stream to flow cross-current to the direction of flow of said primary stream in said indirect evaporative cooler.

10. The method in accordance with claim 1 including returning air from said conditioned space to provide returned air and processing returned air through said adsorption wheel to provide said secondary stream.

11. The method in accordance with claim 1 wherein said indirect evaporative cooler has a first dry side and second dry side and directing said primary stream through said first dry side and directing said secondary stream through said second dry side prior to directing said secondary stream into said wet side.

12. The method in accordance with claim 1 including introducing said cooled air from said indirect evaporative cooler to a direct evaporative cooler for further cooling.

13. The method in accordance with claim 1 including changing the adsorption wheel speed to vary the level of humidity in the primary stream exiting said wheel.

14. The method in accordance with claim 1 including the step of bypassing said adsorption wheel with at least a portion of said process air.

15. A method of conditioning a process stream of air in an air conditioning system wherein a process stream of air is dehumidified and cooled to provide a conditioned stream of air for introducing to a conditioned space, the method comprising the steps of:

(a) providing an enthalpy wheel comprised of an adsorbent, the enthalpy wheel having a multiplicity of passages through which said process air can flow, the enthalpy wheel capable of regeneration by passing an air stream therethrough having a temperature and humidity lower than said process air;

(b) passing said process air through said enthalpy wheel to remove heat and moisture therefrom;

(c) providing an adsorption wheel having a multiplicity of passages through which process air can flow for adsorbing moisture therefrom, the wheel capable of adsorption of moisture from said process air and of regeneration on a continuous basis as the wheel rotates;

(d) providing an indirect evaporative cooler having a dry side and a wet side separated by a wall wherein heat is extracted from said dry side through the wall to said wet side, cooling in said dry side achieved by evaporation of water into air passing through said wet side;

(e) passing process air from said enthalpy wheel through said adsorption wheel to remove moisture therefrom to provide a moisture-depleted stream of process air exiting said adsorption wheel;

(f) regenerating said adsorption wheel by passing hot gases therethrough to remove moisture from said adsorption wheel;

(g) dividing said moisture-depleted stream of process air exiting said adsorption wheel into a primary stream and a secondary stream; and (h) introducing said secondary stream of process air into said wet side of said indirect evaporative cooler and introducing said primary stream into said dry side, said secondary stream evaporating water thereinto thereby cooling said wall and removing heat from said primary stream to provide cooled air to be introduced to a conditioned space.

16. The method in accordance with claim 15 including introducing said cooled air from said indirect evaporative cooler to a direct evaporative cooler for further cooling.

17. The method in accordance with claim 15 including returning air from said conditioned space and exhausting through said enthalpy wheel.

18. The method in accordance with claim 15 including cooling said secondary stream in a heat exchanger prior to introducing said secondary stream to said wet side of said indirect evaporative cooler.

19. The method in accordance with claim 18 including utilizing an outside air stream to cool said heat exchanger.

20. The method in accordance with claim 19 including heating said outside air stream exiting said heat exchanger for regenerating said adsorption wheel.

21. The method in accordance with claim 15 including directing said secondary stream to flow concurrent to the direction of flow of said primary stream in said indirect evaporative cooler.

22. The method in accordance with claim 15 including directing said secondary stream to flow countercurrent to the direction of flow of said primary stream in said indirect evaporative cooler.

23. The method in accordance with claim 15 including changing the adsorption wheel speed to vary the level of humidity in the primary stream exiting said wheel.

24. The method in accordance with claim 15 including the step of bypassing said adsorption wheel with at least a portion of said process air.

25. The method in accordance with claim 15 including returning air from said conditioned space to provide returned air and processing returned air through said adsorption wheel to provide said secondary stream.

26. A method of conditioning process air in an air conditioning system wherein process air is dehumidified and cooled to provide conditioned air for introducing to a conditioned space, the method comprising the steps of:

(a) providing an adsorption wheel having a multiplicity of passages through which process air can flow for adsorbing moisture therefrom, the wheel capable of adsorption of moisture from said process air and of regeneration on a continuous basis as the wheel rotates;

(b) providing an indirect evaporative cooler having a dry side and a wet side separated by a wall wherein heat is extracted from said dry side through the wall to said wet side, cooling in said dry side achieved by evaporation of water into air passing through said wet side;

(c) regenerating said adsorption wheel by passing hot gases therethrough to remove moisture from said adsorption wheel;

(d) returning air from said conditioned space to provide returned air for introducing to said adsorption wheel;

(e) dividing said returned air into a first stream and a second stream for directing through said adsorption wheel;

(f) directing said second stream through said adsorption wheel after said regenerating and before said first stream to provide a moisture-depleted secondary stream;

(g) adding make-up air to said first stream to provide process air and directing said process air through said adsorption wheel to provide a moisture-depleted primary stream; and (h) introducing said moisture-depleted secondary stream of process air into said wet side of said indirect evaporative cooler and introducing said moisture-depleted primary stream into said dry side, said moisture-depleted secondary stream evaporating water thereinto thereby cooling said wall and removing heat from said primary stream to provide cooled air to be introduced to a conditioned space.

27. The method in accordance with claim 26 wherein said secondary stream comprises 10 to 50% of said moisture-depleted stream exiting said adsorption wheel.

28. The method in accordance with claim 26 wherein said secondary stream exiting said adsorption wheel has an average temperature higher than the average temperature of said primary stream exiting said adsorption wheel.

29. The method in accordance with claim 26 including cooling said secondary stream in a heat exchanger prior to introducing said secondary stream to said wet side of said indirect evaporative cooler.

30. The method in accordance with claim 29 including utilizing an outside air stream to cool said heat exchanger.

31. The method in accordance with claim 26 including directing said secondary stream to flow concurrent to the direction of flow of said primary stream in said indirect evaporative cooler.

32. The method in accordance with claim 26 including directing said secondary stream to flow countercurrent to the direction of flow of said primary stream in said indirect evaporative cooler.

33. The method in accordance with claim 26 wherein said indirect evaporative cooler has a first dry side and second dry side and directing said primary stream through said first dry side and directing said secondary stream through said second dry side prior to directing said secondary stream into said wet side.

34. The method in accordance with claim 26 including introducing said cooled air from said indirect evaporative cooler to a direct evaporative cooler for further cooling.

35. The method in accordance with claim 26 including changing the adsorption wheel speed to vary the level of humidity in the primary stream exiting said wheel.

36. The method in accordance with claim 26 including the step of bypassing said adsorption wheel with at least a portion of said process air.

* * * * *